Sept. 22, 1931.   A. Y. DODGE ET AL   1,824,038
BRAKE OPERATING MEANS
Filed July 2, 1928

INVENTOR
ADIEL Y. DODGE
ROY S. SANFORD
BY
M. W. McConkey
ATTORNEY

Patented Sept. 22, 1931

1,824,038

UNITED STATES PATENT OFFICE

ADIEL Y. DODGE AND ROY S. SANFORD, OF SOUTH BEND, INDIANA, ASSIGNORS TO BENDIX BRAKE COMPANY, OF SOUTH BEND, INDIANA, A CORPORATION OF ILLINOIS

BRAKE-OPERATING MEANS

Application filed July 2, 1928. Serial No. 289,818.

This invention relates to brakes, and is illustrated as embodied in a novel operating mechanism for a front automobile brake. An object of the invention is to provide a mechanism of this character which is especially suited for use with heavy-duty brakes for trucks and busses. Preferably the mechanism includes a cam-shaft having an integral hollow head resting against the bracket in which the shaft is journaled, and connected by a novel joint to an operating shaft having one end projecting into said head.

The above and other objects and features of the invention, including various novel and desirable details of construction, will be apparent from the following description of the illustrative embodiment shown in the accompanying drawings, in which.

Figure 1:
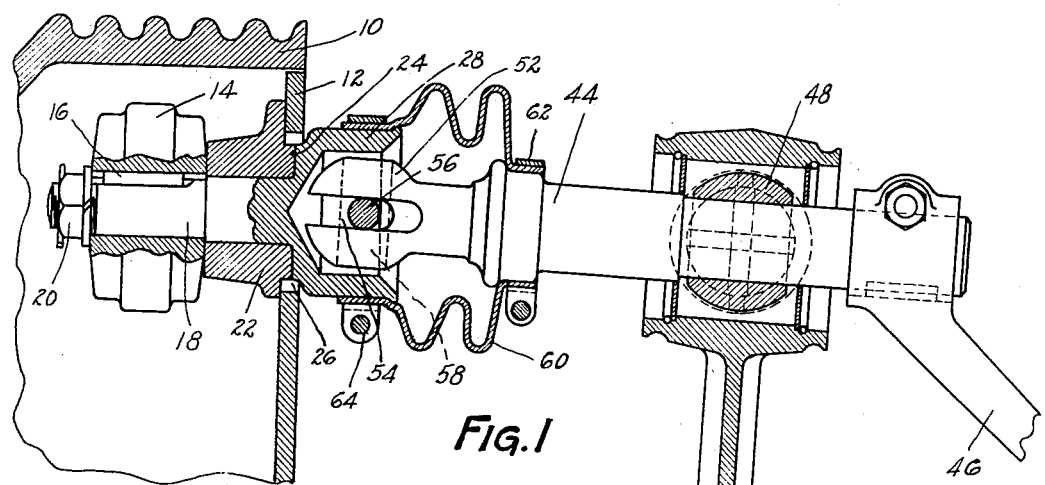
Figure 1 is a vertical transverse section through one front brake, and lengthwise through the control therefor, looking forward at the left front brake.
Figures 2, 3:
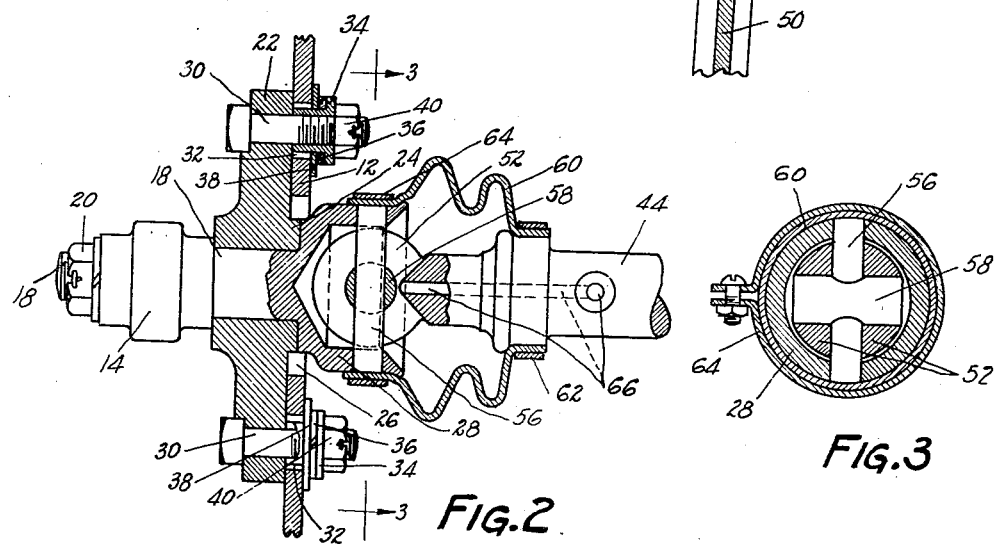
Figure 2 is a horizontal section through the left end of the control of Figure 1.
Figure 3 is a section through the control on the line 3—3 of Figure 2.

The brake illustrated includes a rotatable drum 10, at the open side of which is a backing plate 12, and within which are the brake shoes or their equivalent (not shown) operated to apply the brake by means such as a double cam 14 connected by a key 16 or the like to a novel cam-shaft 18 and held thereon by means such as a nut 20 threaded on the reduced end of the shaft.

Shaft 18 is journaled in a bracket 22 having a boss 24 extending into an opening 26 in plate 12 and formed on its end with a plane surface engaged by a similar surface on a hollow head 28 integrally formed on the end of shaft 18. Bracket 22 has laterally-extending wings secured to plate 12 by bolts 30 passing through relatively large openings 32 in the backing plate. Spacer washers 34, having lock washers 36 and friction washers 38 sleeved thereon, are held by nuts 40 threaded on the bolts, and hold the bracket 22 to plate 12 frictionally under fixed tension sufficient to prevent shifting when the brake is released. The bracket can, however, shift when the brake is applied to permit the cam 14 to center itself.

The cam-shaft 18 is connected, by a novel universal joint at the swiveling axis of the wheel, to an operating shaft 44 having an operating lever 46 at its end, and which is shown as journaled in a ball 48 mounted in a socket at the upper end of a support 50 mounted on the front axle.

The operating shaft 44 is formed at the left with an enlarged generally-spherical ball 52 inside of the hollow head 28, and formed with a cross slot 54 receiving a connecting pin 56 held at its ends by the sides of the hollow head 28. Pin 56 passes through a central opening in a connector pivot 58 mounted in an opening in the spherical end 52 at right angles to the plane of slot 54.

The joint may be protected by a boot 60 secured by a clamp 62 at one end to shaft 44, and secured at the other end by a clamp 64 encircling head 28 and confining pin 56 against endwise movement. The joint may be lubricated through a passage 66 extending through the shaft and opening into the slot 54.

While one illustrative embodiment has been described in detail, it is not our intention to limit the scope of the invention to that particular embodiment, or otherwise than by the terms of the appended claims.

We claim:

1. Brake-operating means comprising, in combination with a backing plate, a supporting bracket engaging one face of said plate, a camshaft journaled in said bracket and having an enlarged hollow head at its end projecting through an opening in the backing plate and resting against the backing plate side of said bracket, an operating shaft having an enlarged end inside of the hollow head in spaced relation to the side walls thereof and formed with a cross slot extending through said end and provided with a connector pivot at right angles to said slot, and a connecting pin held at its ends by the sides of the hollow head and received in said slot and passing through said pivot.

2. Brake-operating means comprising, in combination with a backing plate, a supporting bracket engaging one face of said plate, a camshaft journaled in said bracket and having an enlarged hollow head at its end projecting through an opening in the backing plate and resting against the backing plate side of said bracket, an operating shaft having an enlarged generally-spherical end inside of the hollow head and formed with a cross slot extending through said end and provided with a connector pivot at right angles to said slot, and a connecting pin held at its ends by the sides of the hollow head and received in said slot and passing through said pivot, said operating shaft having a lubricant conduit opening into said slot.

3. Brake-operating means comprising, in combination, two shafts connected by a universal joint including a transverse connecting pin, a boot enclosing the joint, the edge of said boot covering said pin and a clamp encircling the boot, said clamp holding the pin against movement lengthwise.

In testimony whereof, we have hereunto signed our names.

ADIEL Y. DODGE.
ROY S. SANFORD.